United States Patent
Baldea et al.

(10) Patent No.: US 10,393,287 B2
(45) Date of Patent: Aug. 27, 2019

(54) SYSTEMS AND METHODS FOR THERMALLY ACTUATED FLOW CONTROL

(71) Applicant: BOARD OF REGENTS, THE UNIVERSITY OF TEXAS SYSTEM, Austin, TX (US)

(72) Inventors: Michael Baldea, Austin, TX (US); Richard Pattison, Austin, TX (US); Melissa Donahue, Austin, TX (US); Akash Gupta, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 94 days.

(21) Appl. No.: 15/555,120

(22) PCT Filed: Mar. 2, 2016

(86) PCT No.: PCT/US2016/020400
§ 371 (c)(1),
(2) Date: Sep. 1, 2017

(87) PCT Pub. No.: WO2016/141033
PCT Pub. Date: Sep. 9, 2016

(65) Prior Publication Data
US 2018/0038513 A1    Feb. 8, 2018

Related U.S. Application Data

(60) Provisional application No. 62/126,878, filed on Mar. 2, 2015.

(51) Int. Cl.
*B01J 19/00* (2006.01)
*F16K 31/00* (2006.01)
(Continued)

(52) U.S. Cl.
CPC ....... *F16K 99/0036* (2013.01); *B01J 19/0093* (2013.01); *F16K 31/002* (2013.01);
(Continued)

(58) Field of Classification Search
CPC ............... B01J 19/0093; F16K 31/002; F16K 99/0026; F16K 99/0036; G05D 23/1854
See application file for complete search history.

(56) References Cited

U.S. PATENT DOCUMENTS 3,450,344 A    6/1969    O'Brien
3,803,436 A  *  4/1974    Morrell ................. H01J 29/073
                                                                     313/284
(Continued)

FOREIGN PATENT DOCUMENTS

WO    2014/087160    6/2014

OTHER PUBLICATIONS

Baldea, "From process integration to process intensification". Comput. Chem. Eng. 81, 104-114, 2015.
(Continued)

*Primary Examiner* — Henry T Crenshaw
(74) *Attorney, Agent, or Firm* — Meunier Carlin & Curfman LLC

(57) ABSTRACT

Various implementations provide an inherently safer design feature for microchannel reactors that provides temperature control at the individual channel level. This approach relies on bimetallic strips embedded within the combustion channel, forming a thermally-actuated "valve". Bimetallic strips convert a temperature change into a mechanical displacement. Heating the strip increases its deflection and thereby restricts flow in the combustion channels, which consequently reduces the rate of heat generation. The thermally-actuated valve is not limited to use in microchannel reactors and may be used in other structures for which thermally
(Continued)

actuated flow control is desired, according to some implementations.

25 Claims, 9 Drawing Sheets

(51) Int. Cl.
  *G05D 23/185* (2006.01)
  *F16K 99/00* (2006.01)
(52) U.S. Cl.
  CPC ..... *F16K 99/0026* (2013.01); *G05D 23/1854* (2013.01); *B01J 2219/0086* (2013.01); *B01J 2219/0095* (2013.01); *B01J 2219/00783* (2013.01); *B01J 2219/00792* (2013.01); *B01J 2219/00822* (2013.01); *B01J 2219/00835* (2013.01); *B01J 2219/00855* (2013.01); *B01J 2219/00873* (2013.01); *B01J 2219/00876* (2013.01)

(56) References Cited

U.S. PATENT DOCUMENTS

| | | | | |
|---|---|---|---|---|
| 3,811,028 | A * | 5/1974 | Henry | B23K 11/20 219/78.02 |
| 3,895,812 | A * | 7/1975 | Harr, Jr. | F16J 15/0806 105/424 |
| 4,039,993 | A * | 8/1977 | Kerr | H01H 37/58 335/145 |
| 6,039,262 | A | 3/2000 | Deanna | |
| 2003/0180216 | A1* | 9/2003 | TeGrotenhuis | B01B 1/005 423/659 |
| 2004/0103660 | A1* | 6/2004 | Kawamura | F28F 13/003 60/599 |
| 2009/0020168 | A1* | 1/2009 | Franconi | G05D 23/022 137/468 |
| 2010/0089468 | A1* | 4/2010 | Scott | F23R 3/06 137/468 |
| 2010/0118911 | A1* | 5/2010 | Lorrette | G01K 7/18 374/1 |
| 2010/0199485 | A1* | 8/2010 | Dell | F16B 2/02 29/525.09 |
| 2012/0087088 | A1* | 4/2012 | Killion | F28D 15/0266 361/697 |
| 2014/0144611 | A1* | 5/2014 | Yoshimura | F28F 7/02 165/168 |

OTHER PUBLICATIONS

Baldea, et al., "Dynamics and control of autothermal reactors for the production of hydrogen", Chem. Eng. Sci., 62:3218-3230, 2007.
Butcher, et al., "Design of an annular microchannel reactor (AMR) for hydrogen and/or syngas production via methane steam reforming", International Journal of Hydrogen Energy, 39(31):18046-18057, 2014.
Granlund, "Comparison between a micro re-actor with multiple air inlets and a monolith reactor for oxidative steam reforming of diesel", International Journal of Hydrogen Energy, 2014.
Jeon, et al., "Minimization of hot spot in a microchannel reactor for steam reforming of methane with the stripe combustion catalyst layer", International Journal of Hydrogen Energy, 38(32):13982-13990, 2013.
Jeon, et al., "Optimization of a counter-flow microchannel reactor using hydrogen assisted catalytic combustion for steam reforming of methane", Inter-national Journal of Hydrogen Energy, 39(12):6470-6478, 2014.
Khalilpour, et al., "Evaluation of utilization alternatives for stranded natural gas", Energy, 40(1):317-328, 2012.
Kolios, et al., "Efficient reactor concepts for coupling of endothermic and exothermic reactions". Chem. Eng. Sci., 57(9):1505-1510, 2002.
Lerou, et al., "Microchannel reactor architecture enables greener processes," Chem. Eng. Sci., 65(1):380-385, 2010.
Nikacevic, et al., "Opportunities and challenges for process control in process intensification", Chem. Eng. and Proc.: Process Intensification, 52:1-15, 2012.
Pattison, et al., "A thermal-flywheel approach to distributed temperature control in microchannel reactors", AIChE J., 59(6):2051-2061, 2013.
Pattison, et al., "Pseudodistributed feed configurations for catalytic plate microchannel reactors", Ind. Eng. Chem. Res., 53(13):5028-5037, 2014.
Pattison, et al., "Robust autothermal microchannel reactors", Computers and Chemical Engineering 81, 171-179, 2015.
Process Systems Enterprise. General PROcess Modeling System (gPROMS) available on-line: www.psenterprise.com/gproms, 1997-2014, 4 pages.
Ramaswamy, et al., "Coupling exothermic and endothermic reactions in adiabatic reactors", Chem. Eng. Sci., 63(6):1654-1667, 2008.
Ramaswamy, et al., "Recuperative coupling of exothermic and endothermic reactions", Chem. Eng. Sci., 61(2):459-472, 2006.
Stankiewicz, et al., "Process intensification: transforming chemical engineering" Chem. Eng. Prog., 96(1):22-34, 2000.
Thomas, et al., "Review of ways to transport natural gas energy from countries which do not need the gas for domestic use", Energy, 28(14):1461-1477, 2003.
Vaccaro, "Micro-Scale Catalytic Reactor for Syngas Production", Ind. Eng. Chem. Res., 49(21):10924-10933, 2010.
Vaccaro, et al. Catalytic combustion for supplying energy for endothermic reaction. J Adv Chem Eng, 4(107):2, 2014.
Wood, et al., "Technology options for securing markets for remote gas", In Proc. 87th Annual Convention, GPA, 2008.
Xu, et al., "Methane steam reforming, methanation and water-gas shift: I. Intrinsic kinetics", AIChE J., 35(1):88-96, 1989.
Zanfir, et al., "Catalytic combustion assisted methane steam reforming in a catalytic plate reactor", Chem. Eng. Sci., 58(17):3947-3960, 2003.
Zanfir, et al., "Optimizing the catalyst distribution for countercurrent methane steam reforming in plate reactors". AIChE J., 57(9):2518-2528, 2011.
International Search Report and Written Opinion issued in Application No. PCT/US2016/020400, dated May 11, 2016.
International Preliminary Report on Patentability Opinion issued in Application No. PCT/US2016/020400, dated Sep. 14, 2017.

* cited by examiner

SYSTEMS AND METHODS FOR THERMALLY ACTUATED FLOW CONTROL

CROSS REFERENCE TO RELATED APPLICATION

This application claims priority to U.S. Provisional Patent Application No. 62/126,878 entitled "Systems and Methods for Thermally Actuated Flow Control," filed Mar. 2, 2015, the content of which is herein incorporated by reference in its entirety.

BACKGROUND

Microchannel reactors are one of the most successful implementations of the process intensification concept. Reduced geometric dimensions of the flow channels (typically on the order of millimeters) increase the surface-area-to-volume ratio and minimize transport limitations, resulting in a much faster, reaction rate-limited process. Equipment sizes of intensified processes using microchannel reactors are at least one order of magnitude smaller than conventional devices of equivalent capacity, and consequently result in significant capital savings. Additionally, reduced holdups improve process safety and efficiency and make the process more agile. Microchannel reactors have found many industrial applications, notably in small scale gas-to-liquids processing.

The capital and operating cost savings associated with microchannel reactors come at the price of several control challenges. The combination of unit operations (heat exchange, reaction, fluid flow) in a single device results in a loss of degrees of freedom. Additionally, reduced dimensions make it difficult to incorporate distributed sensors and actuators, thus limiting the control of such reactors to a boundary approach based on sensing and adjusting the channel output and, respectively, input properties.

For steam methane reforming applications, the operation is typically autothermal, i.e., an exothermic reaction provides heat to an endothermic set of reactions that are carried out in parallel, alternating channels. While autothermal designs avoid the need for an external heating medium, they can be more challenging to operate. Heat generation in the exothermic channels must be coordinated with heat consumption in the endothermic channels. Improper alignment (in the axial dimension) of heat fluxes can result in the formation of hotspots (if local heat generation exceeds consumption) or reactor extinction. Several published design concepts for autothermal microchannel reactors seek to improve steady-state temperature and conversion profiles and limit the advent of hotspots in steady-state operation. Among these are distributed feed designs, in which reactants are fed at multiple points along the reactor, offsetting the active sections of the catalyst coatings, which shifts the consumption and release of heat towards the center of the reactor, and segmented combustion catalyst designs which more finely modulate heat generation along the reactor. However, very few studies have focused on the dynamic challenges associated with the operation of microchannel reactors.

Bimetallic strips convert temperature change into mechanical displacements. The bimetallic strips include two metal strips. Each metal strip has a thermal expansion coefficient that is different from the thermal expansion coefficient of the other metal strip. The metal strips are fixedly or rigidly attached at both ends (e.g., by riveting, brazing, or welding). Assuming that the bimetallic strip is flat at the reference temperature ($T_{ref}$), heating the bimetallic strip results in a deflection of the bimetallic strip in one direction (towards the metal strip having a smaller thermal expansion coefficient $\alpha_1$), while cooling results in the bimetallic strip deflecting in the opposite direction (toward the metal strip having a larger thermal expansion coefficient $\alpha_2$). A deflection of the bimetallic strip due to heating the bimetallic strip is shown in FIG. 1B. Bimetallic strips have found applications in clocks, thermostats, and electrical devices as mechanical temperature sensors. In these applications, displacement of the free end of the bimetallic strips typically moves another structure, such as a valve stem or a switch.

The curvature of the bimetallic strips can be computed as a function of temperature based on the physical properties of the two metals. If one end of the strip is fixed (e.g., to a surface), and the other end of the strip is free to deflect, the deflection, d, of the free end can be related to the temperature of the bimetallic strip by Equation 1 below:

$$d = \frac{3L_{strip}^2(1+m)^2(\alpha_2 - \alpha_1)(T - T_{ref})}{H_{strip}[3(1+m)^2 + (1+mn)(m^2 + 1/mn)]} \quad (1)$$

The deflection, d, is measured from the flat surface to the tip, and $L_{strip}$ and $H_{strip}$ are the length and thickness of the bimetallic strip at the construction temperature, respectively. The values m and n are ratios of the metal thicknesses (H1/H2) and Young's moduli, respectively. $\alpha_1$ and $\alpha_2$ are the thermal expansion coefficients of the two metals used in the bimetallic strip. T is the temperature of the bimetallic strip, and $T_{ref}$ is the temperature at which the anchor surface and bimetallic strips are constructed (here, assumed to be 25° C.).

In an exemplary reactor model, a catalytic plate microchannel reactor operates autothermally, e.g., an exothermic reaction (combustion of methane) takes place in one set of channels and provides heat for an endothermic reaction (steam methane reforming reactions) occurring in alternating channels. The base case model is shown in FIG. 2 with parameters given in Table 1 below.

TABLE 1

Nominal reactor system parameters

| Parameter | Value |
|---|---|
| Reactor Length | 63.4 cm |
| Reforming Channel Height | 2.0 mm |
| Combustion Channel Height | 2.0 mm |
| Plate Thickness | 0.5 mm |
| Reforming Catalyst Height | 20 pm |
| Combustion Catalyst Height | 20 pm |
| Reforming Inlet Temperature | 793.15 K |
| Combustion Inlet Temperature | 793.15 K |
| Reforming Inlet Velocity | 4.0 m/s |
| Combustion Inlet Velocity | 3.0 m/s |
| Reforming Inlet Pressure | 1.085 bar |
| Combustion Inlet Pressure | 1.085 bar |
| Reforming Catalyst Offset | 25.8 cm (from left) |
| Combustion Catalyst Offset | 31.6 cm (from right) |
| Reforming Inlet Composition (Mass Fraction) | 19.11% $CH_4$ |
| | 72.18% $H_2O$ |
| | 2.94% $CO_2$ |
| | 0.29% $H_2$ |
| | 5.48% $N_2$ |
| Combustion Inlet Composition (Mass Fraction) | 5.26% $CH_4$ |
| | 22.00% $O_2$ |
| | 72.65% $N_2$ |

In one implementation, at least a portion of each channel has an offset catalyst coating, where the coated portions are located so as to coordinate heat generation and consumption and maximize methane conversion.

The reforming reactions occurring in the endothermic channels are as follows:

$$CH_4 + H_2O \rightleftharpoons CO + 3H_2$$

$\Delta H = +206 \text{ kJ mol}^{-1}$   Methane steam reforming (1)

$$CO + H_2O \rightleftharpoons CO_2 + H_2$$

$\Delta H = -41 \text{ kJ mol}^{-1}$   Water-gas-shift (2)

$$CH_4 + 2H_2O \rightleftharpoons CO_2 + 4H_2$$

$\Delta H = +165 \text{ kJ mol}^{-1}$   Reverse methanation (3)

The reaction kinetics for a 15.2% $Ni/Mg/Al_2O_3$ catalyst are described accurately over a wide range of temperatures and pressures by the Langmuir-Hinshelwood-Hougen-Watson approach developed by Xu et al. See J. G. Xu and G. F. Froment, Methane steam reforming, methanation and water-gas shift 0.1. Intrinsic kinetics. *AlChE J.*, 35(1):88-96, 1989.

Catalytic and homogeneous combustion of methane occurs in the alternate channels and in countercurrent flow.

$$CH_4 + 2O_2 \rightarrow CO_2 + 2H_2O$$

$\Delta H = -803 \text{ kJ mol}^{-1}$   Methane combustion (4)

The reaction kinetics for catalytic combustion on a noble metal catalyst (e.g., Pd or Pt) are first order and zeroth order with respect to methane and oxygen concentration, respectively. Homogeneous combustion has a measurable effect and the kinetics are given by a rate law of order −0.3 with respect to methane and 1.3 with respect to oxygen.

The model reactor considers the combustion and reforming half-channels (with symmetry boundary conditions at the channel centers), the combustion and reforming catalyst layers, and the metal plate. Two-dimensional convection-diffusion-reacting flow is modeled in the channels assuming a laminar, parabolic flow profile between infinite parallel plates. A 1-dimensional model assuming a negligible thickness is used for the catalyst layers, and a 2-dimensional heat equation is used to model the plate.

The model was developed and solved in gPROMS. Backward and forward finite differences were used to discretize the partial derivatives in the axial domains for the reforming and combustion channels, respectively, while central finite differences were used to discretize the partial derivatives in the axial domain of the plate. Orthogonal collocation on finite elements were used to discretize the partial derivatives in the radial domain of every layer. The complete set of model equations are available in previous work and are included at the end of this specification.

BRIEF SUMMARY

Various implementations provide an inherently safer design feature for microchannel reactors that provides temperature control at the individual channel level. Bimetallic strips are installed within the combustion channel to regulate fluid flow in the channel, forming a thermally-actuated "valve". Bimetallic strips convert a temperature change into a mechanical displacement. Heating the strip increases its deflection from a wall and thereby restricts but does not completely block flow in the combustion channels, which consequently reduces the rate of heat generation, according to some implementations. In other implementations, the thermally-actuated valve may be used in other structures for which thermally actuated flow control is desired.

According to certain implementations, a thermally actuated flow control system includes a first linear array of bimetallic strips disposed on a first wall of a channel and a second linear array of bimetallic strips disposed on a second wall of the channel. The first and second walls are opposite and in a facing relationship with each other relative to an axis of fluid flow through the channel. Each bimetallic strip includes a fixed end and a free end. The fixed ends of the bimetallic strips in the first array are coupled to the first wall, and the fixed ends of the bimetallic strips in the second array are coupled to the second wall. Each bimetallic strip includes a first metal strip having a first thermal expansion coefficient and a second metal strip having a second thermal expansion coefficient. The first and second metal strips are fixedly coupled together, and the first thermal expansion coefficient is higher than the second thermal expansion coefficient. The first metal strip is coupled to the wall, and the second metal strip extends towards the axis of fluid flow of the channel. A deflection of the free ends of the first array of bimetallic strips away from the first wall and the free ends of the second array of bimetallic strips away from the second wall increases as a temperature of the fluid flowing through the channel increases, which decreases a flowrate of a fluid through the channel. Deflection of the free ends decreases as the temperature of the fluid decreases, which increases the flowrate of the fluid through the channel.

In some implementations, the first thermal expansion coefficient is about 5% to about 40% less than the second thermal expansion coefficient. For example, in one implementation, the first thermal expansion coefficient is about 33% less than the second thermal expansion coefficient. In another implementation, the first thermal expansion coefficient is about 5% to about 10% less than the second thermal expansion coefficient.

In some implementations, the fixed ends are directly coupled to the channel walls. In other implementations, the fixed ends are indirectly coupled to the channel walls.

In some implementations, the length of each bimetallic strip is at least ten times longer than the thickness of each bimetallic strip. The length is measured in the axial flow direction between the fixed end and the free end, and the thickness of each bimetallic strip includes a thickness of the first metal strip and the second metal strip. Furthermore, the length of each bimetallic strip may be at least ten times longer than a width of each bimetallic strip. The width is measured in a direction that is orthogonal to the length direction and thickness direction. In some implementations, the width and thickness of each bimetallic strip may be about the same. However, in other implementations, the width of each bimetallic strip may be between about 5 and about 10 times greater than the thickness of each bimetallic strip.

A distance between the first and second walls of the channel may be at least ten times longer than a thickness of each bimetallic strip, according to some implementations. For example, in one implementations, the distance between the first and second walls is around twenty times longer than the thickness of each bimetallic strip.

In some implementations, a thickness of the first metal strip may be at least $\frac{1}{10}^{th}$ of a thickness of the bimetallic strip, and a thickness of the second metal strip may be at least $\frac{1}{10}^{th}$ of a thickness of the bimetallic strip.

The free ends of the bimetallic strips in the first array may be aligned with the free ends of the bimetallic strips in the second array within a plane that bisects the first and second walls and is perpendicular to an axis of flow through the channel, according to certain implementations.

In some implementations, the first and second arrays of bimetallic strips are disposed adjacent to a portion of the channel where the largest temperature changes are expected to occur. For example, in some implementations, the first and second arrays are disposed centrally along a length of the channel.

A length of each bimetallic strip is selected such that a distance between the free ends of the first array and the free ends of the second array is at least about 5% of a height of the channel at a maximum expected temperature for the fluid, according to certain implementations. The length is measured in the axial flow direction between the fixed end and the free end of each bimetallic strip. Alternatively, the lengths of the bimetallic strips are selected such that the free ends are not spaced apart at the maximum expected temperature for the fluid, according to some implementations.

In some implementations, the channel is defined within a microchannel reactor. In particular, in certain implementations, the channel is defined by at least two parallel plates.

In other implementations, the channel is defined by an inner wall of a cylindrically shaped pipe. In one such implementation, a width of each bimetallic strip is between about 1/60th and about 1/6th of a circumference of the channel, and a distance between edges of adjacent bimetallic strips is between about 1/60th and about 1/6th of the circumference of the channel. Edges of each bimetallic strip extend between the fixed and free ends of each bimetallic strip, and the edges are perpendicular to the direction of flow through the channel. The free ends of the bimetallic strips deflect towards a central axis of the cylindrically shaped pipe.

In some implementations, heat from the fluid in the channel is conducted through at least one wall of the channel to a device coupled to an external wall of the channel. The deflection of the bimetallic strips in response to the temperature of the fluid flowing through the channel controls the amount of heat transferred through the channel wall to the device.

BRIEF SUMMARY OF THE DRAWINGS

The components in the drawings are not necessarily to scale relative to each other and like reference numerals designate corresponding parts throughout the several views.

DETAILED DESCRIPTION

Various implementations provide an inherently safer design feature for microchannel reactors that provides temperature control at the individual channel level. This approach relies on bimetallic strips embedded within the combustion channel, forming a thermally-actuated "valve". Bimetallic strips convert a temperature change into a mechanical displacement. Heating the strip increases its deflection and thereby restricts but does not completely block flow in the combustion channels of the reactor, which consequently reduces the rate of heat generation according to some implementations. The thermally-actuated valve is not limited to use in microchannel reactors and may be used in other structures for which thermally actuated flow control is desired, according to some implementations.

Figure 4:
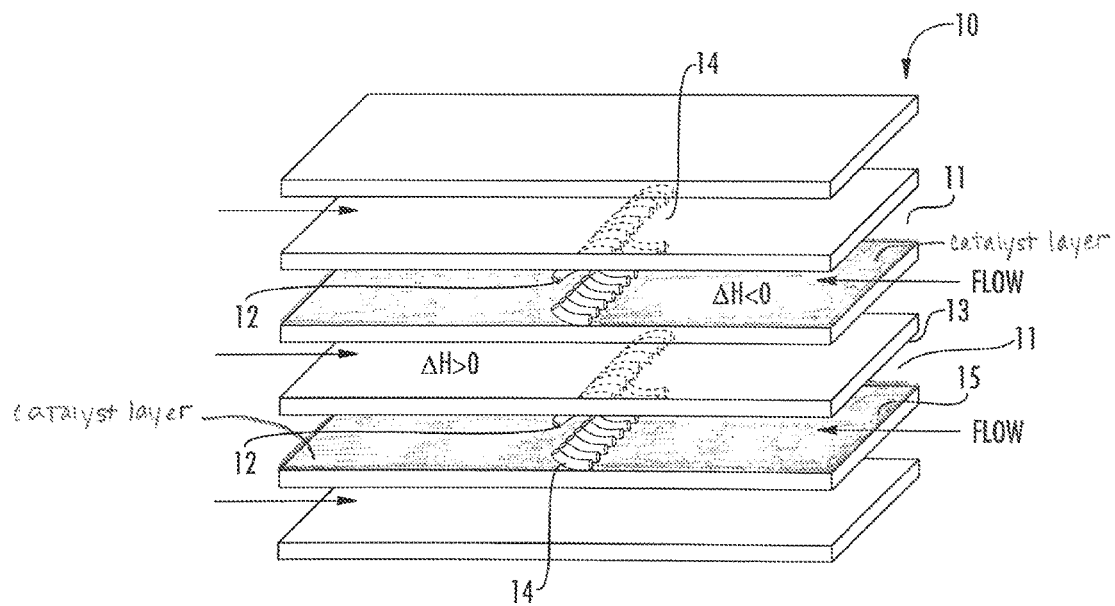
FIG. 4 is a perspective view of thermally-actuated valves disposed in the channel shown in FIG. 3 according to one implementation.

FIGS. 3 through 5C illustrate a thermally actuated flow control system 10 according to one implementation. The system includes a first linear array of bimetallic strips 12 disposed on an upper wall 13 of a combustion channel 11 and a second linear array of bimetallic strips 14 disposed on a lower wall 15 of the combustion channel 11. The upper 13 and lower walls 15 are opposite and in a facing relationship with each other relative to an axis of fluid flow through the channel 11. The bimetallic strips 12, 14 disposed in the combustion channel 11 act as thermally-actuated valves that regulate flow through the channel 11. FIG. 4 illustrates a perspective view of an autothermal microchannel reactor with thermally-actuated valves disposed therein, according to one implementation.

Each bimetallic strip 12, 14 includes a fixed end 16 and a free end 17. The fixed end 16 of the bimetallic strips in the first array 12 are coupled to the upper wall 13 of the channel 11, and the fixed end 16 of the bimetallic strips in the second array 14 are coupled to the lower wall 15 of the channel 11. Each bimetallic strip 12, 14 includes a first metal 21 and a second metal 22 that are fixedly coupled together. The first metal 21 has a first thermal expansion coefficient $\alpha_1$ and the second metal 22 has a second thermal expansion coefficient $\alpha_2$. The first thermal expansion coefficient $\alpha_1$ is less than the second thermal expansion coefficient $\alpha_2$. For example, the first thermal expansion coefficient $\alpha_1$ may be about 20% to about 40% less than the second thermal expansion coefficient $\alpha_2$. In one implementation, the first thermal expansion coefficient $\alpha_1$ may be about 33% less than the second thermal expansion coefficient $\alpha_2$.

In the first linear array, the fixed ends 16 of the bimetallic strips 12 are coupled to the upper wall 13 of the channel 11 such that the first metal 21 faces the direction of flow and the second metal 22 faces the upper wall 13. In the second linear array, the fixed ends 16 of the bimetallic strips 14 are coupled to the lower wall 15 of the channel 11 such that the first metal 21 faces the direction of flow and the second metal 22 faces the lower wall 15. The fixed ends 16 of the bimetallic strips 12, 14 may be directly coupled to the channel walls 13, 15 typically by riveting, brazing, welding, or by any other suitable fastening mechanism or means, according to certain implementations. In other implementations, fixed end 16 is indirectly coupled to the channel walls 13, 15 via an attachment or extension that is coupled or otherwise engaged with the channel walls 13, 15. Furthermore, the free ends 17 of the bimetallic strips 12 in the first linear array are aligned with the free ends 17 of the bimetallic strips 14 in the second linear array within a plane that bisects the upper 13 and lower walls 15 and is perpendicular to the flow direction through the channel.

Figure 5A:
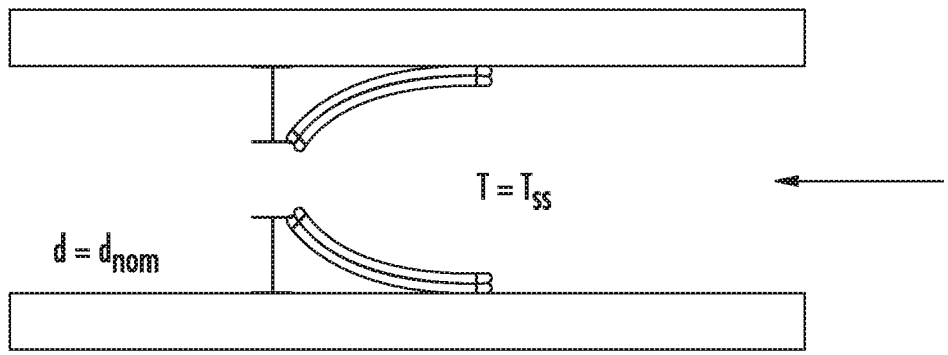
FIG. 5A is a side cross sectional view of thermally-actuated valves having a nominal displacement when a temperature of the fluid flowing over the thermally-actuated valves is within a steady state range of temperatures.
Figure 5B:
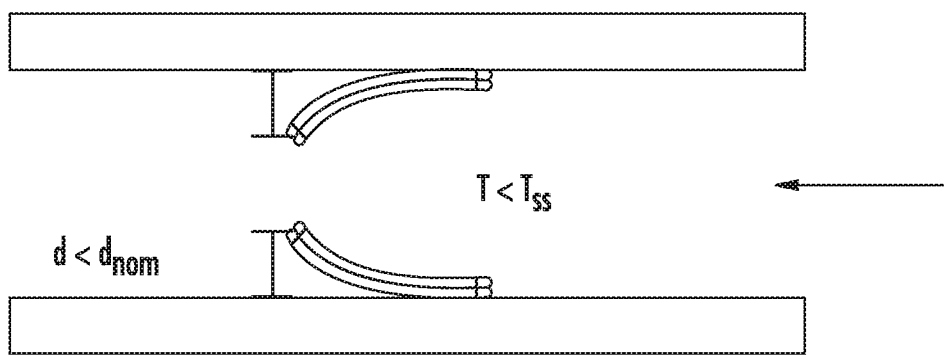
FIG. 5B is a side cross sectional view of thermally-actuated valves having less displacement than is shown FIG. 5A when a temperature of the fluid flowing over the thermally-actuated valves is less than a steady state range of temperatures.
Figure 5C:
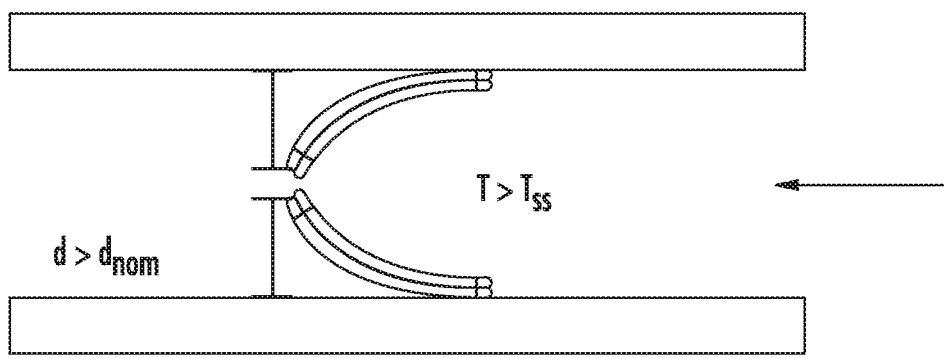
FIG. 5C is a side cross sectional view of thermally-actuated valves having more displacement than is shown FIG. 5A when a temperature of the fluid flowing over the thermally-actuated valves is more than a steady state range of temperatures.

When the bimetallic strips 12, 14 and the reactor channel 11 are constructed, the bimetallic strips 12, 14 are initially flat along the channel walls 13, 15, respectively. However, as the reactor starts up, the temperature of the fluid flowing through the channel 11 increases, and the free ends 17 of the bimetallic strips 12, 14 deflect towards a center of the channel 12 as the temperature of the fluid flowing over the bimetallic strips 12, 14 increases. As the temperature of the fluid flowing through the channel 11 fluctuates from nominal conditions (e.g., a range of temperatures indicative of steady state), the free ends 17 of the bimetallic strips 12, 14 deflect more towards the channel center in response to the temperature rising above the nominal conditions and retract away from the channel center in response to the temperature dropping below the nominal conditions. When the free ends 17 of the bimetallic strips 12, 14 deflect toward the channel center, the flowrate of the fluid (e.g., combustion fuel) through the channel 11 is restricted, which counteracts the temperature rise. When the free ends 17 of the bimetallic strips 12, 14 deflect away from the channel center, the flowrate of the fluid is less restricted, which allows for a higher flowrate. FIGS. 5A-5C illustrate exemplary deflection levels for the bimetallic strips. FIG. 5A illustrates deflection of the free ends 17 during nominal conditions, such as when the temperature is within a range that reflects steady state conditions, $T_{ss}$. FIG. 5B illustrates deflection of the free ends 17 when the temperature of the fluid is higher than the nominal temperature range $T_{ss}$. And, FIG. 5C illustrates deflection of the free ends 17 when the temperature of the fluid is lower than the nominal temperature range $T_{ss}$.

The nominal temperature range depends on the reaction system. For example, for a steam methane reforming system, the nominal temperature range for steady state temperature may be between about 850° C. to about 1100° C., but is typically around 1000° C.

The materials and dimensions for the thermally-actuated flow control system 10 may be selected to ensure that i) the bimetallic strips 12, 14 do not completely overlap at any of the temperatures in the operating range and ii) if a fluctuation in the steady state temperature occurs, the change in deflection results in a meaningful change in the fluid flowrate in the channel 11. Some of the considerations that may be important in designing a reactor with the thermally-actuated flow control system include: i) the location of the valves in the axial dimension (the direction of flow), ii) the selection of materials for the bimetallic strips 12, 14, and iii) the dimensions (e.g., length, thickness, width) of the bimetallic strips.

Figure 1A:
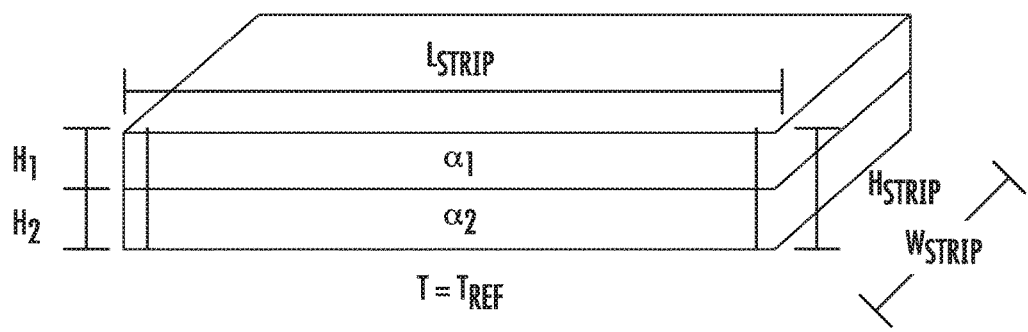
FIG. 1A is a side view of a bimetallic strip after construction.
Figure 1B:
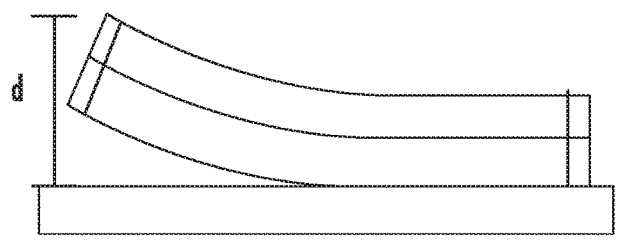
FIG. 1B is a side view of the bimetallic strip in FIG. 1 after being heated.
Figure 2:
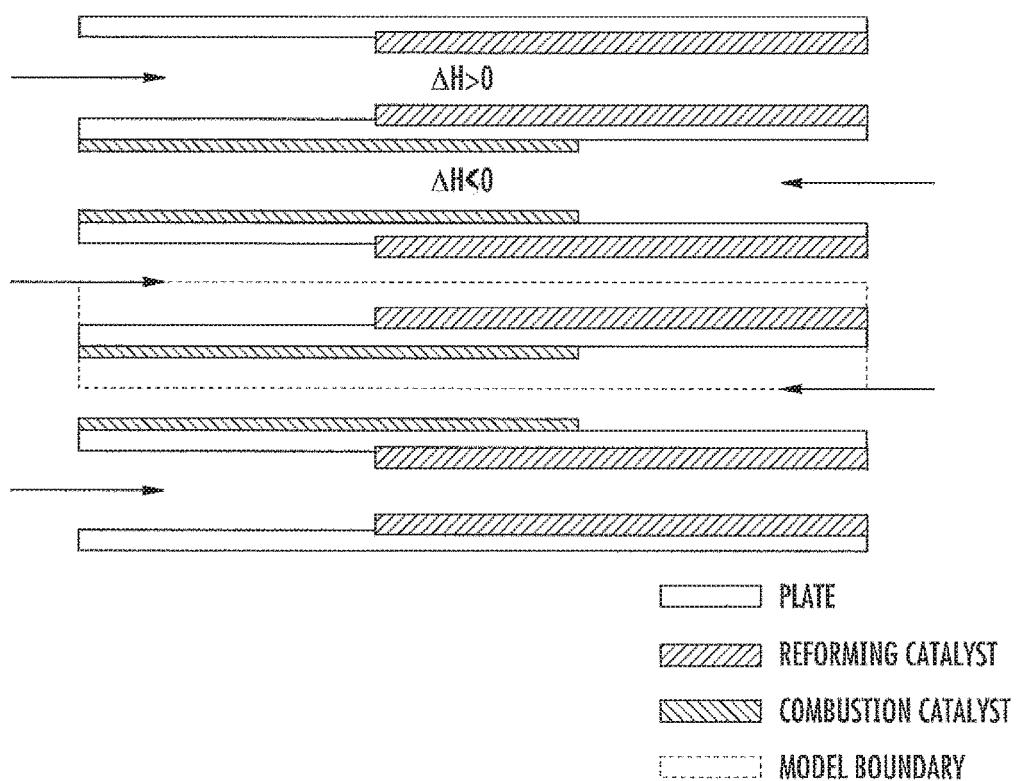
FIG. 2 is a side cross sectional view of an exemplary microchannel reactor.
Figure 3:
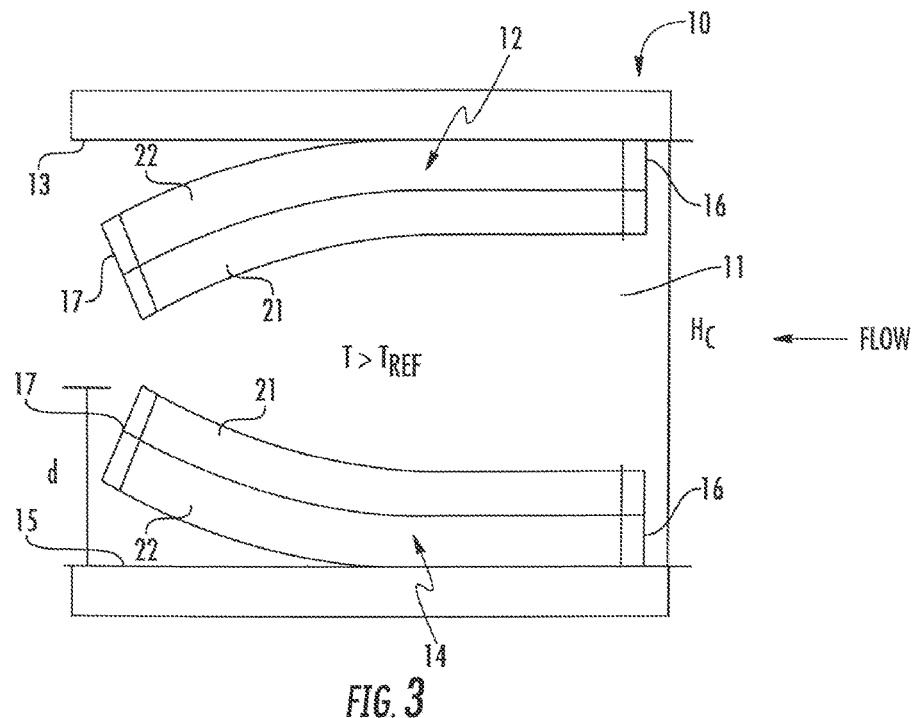
FIG. 3 is a side cross sectional view of thermally-actuated valves disposed within a channel according to one implementation.

According to various implementations, the width $W_{strip}$ and/or thickness $H_{strip}$ of the bimetallic strips 12, 14 are selected such that each does not exceed about 1/10 of the length $L_{strip}$ because thermal expansion occurs in all dimensions, and a wide bimetallic strip would deform at high temperatures. The length $L_{strip}$ of each bimetallic strip 12, 14 is measured between the fixed end 16 and the free end 17. The thickness, or height, $H_{strip}$ of each bimetallic strip 12, 14 includes the combined heights of the first metal strip 21 ($H_1$) and second metal strip 21 ($H_2$) of the bimetallic strip 12, 14. And, the width $W_{strip}$ of each bimetallic strip 12, 14 is the distance between opposite edges of each strip 12, 14. The edges extend between the fixed end 16 and the free end 17 and are perpendicular to the axis of flow. In certain implementations, the width $W_{strip}$ is about the same as the thickness $H_{strip}$. However, in other implementations, the width $W_{strip}$ of each bimetallic strip 12, 14 may be larger or smaller than the thickness $H_{strip}$. For example, in some implementations, the $W_{strip}$ may be between about 5 and about 10 times greater than the thickness $H_{strip}$ of the bimetallic strip 12, 14. See, e.g., FIG. 1 showing the length, width, and height dimensions of a bimetallic strip.

The effectiveness of the thermally-actuated valves as temperature control elements depends on the sensitivity of the bimetallic strips 12, 14 to changes in temperature. In other words, a change in temperature should result in a relatively large deflection for the bimetallic strips 12, 14 to be sufficiently sensitive. Therefore, the valves may be placed along the axial dimension of the reactor channel 11 at one or more locations where the largest (or large) temperature change occurs during potential disturbances that affect the reforming channel, according to some implementations. This location is typically at the center of the reactor. In addition, the materials and dimensions selected for the strips may be selected to provide a large gain (deflection relative to temperature change), according to certain implementations.

Figure 6:
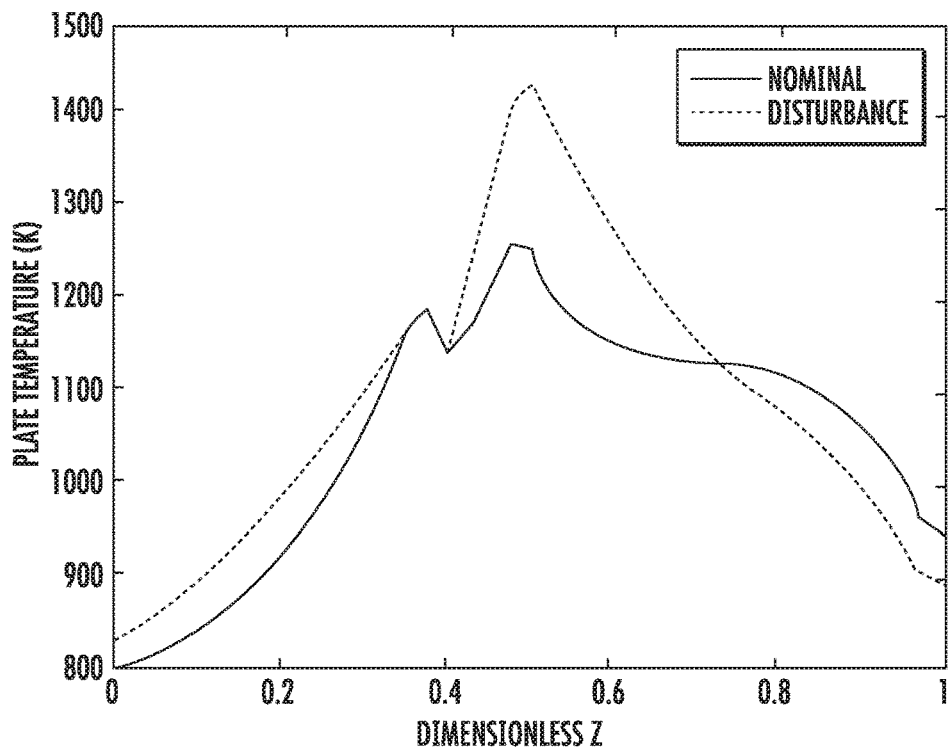
FIG. 6 illustrates an exemplary steady state axial temperature profile before and after a disturbance, according to one implementation.

To identify the location of the largest or sufficiently large temperature change, the reactor may be simulated without valves under a step disturbance in the flowrate to the reforming channels in open-loop. The reforming flowrate may be reduced by 40% of the nominal capacity, resulting in excess heat and a rise in reactor temperatures. An exemplary steady-state axial temperature profile before and after a disturbance are plotted in FIG. 6. Intuitively, the largest change in temperature occurs at the center of the reactor and its location corresponds to the location of the peak nominal temperature (also the point where the catalytically active section of the combustion catalyst layer starts). Placing thermally-actuated valves here results in the largest "gain" for the temperature feedback control loop based on these actuators.

The metal strips 21, 22 in the bimetallic strips 12, 14 are selected to be able to withstand the maximum expected temperature within the channel 11. For example, for a steam methane reforming reaction, the metal strips 21, 22 should be capable of withstanding temperatures in excess of 1000° C. Additionally, the thermal expansion coefficients $\alpha_1$, $\alpha_2$ of the two metal strips 21, 22 should differ by a sufficient amount so that a change in temperature results in a large change in deflection, d (i.e., a high controller "gain").

In some implementations, superalloy metals may be selected for the bimetallic strips 12, 14. For example, in one implementation, the first metal strip 21 is Hastelloy X and the second metal strip 22 is Incoloy 801. Table 2 below indicates various properties of each metal.

TABLE 2

Metal Properties

| Materials | Hastelloy X | Incoloy 801 |
|---|---|---|
| Melting Point (K) | 1583 | 1663 |
| Young's Modulus (GPa) | 137 | 144 |
| Thermal Expansion Coefficient (1/K) | 14.9 × 10⁻⁶ | 18.7 × 10⁻⁶ |
| Metal Composition | 47% Ni | 44.5% Fe |
|  | 22% Cr | 32% Ni |
|  | 18.5% Fe | 20.5% Cr |
|  | 9% Mo | 1.1% Ti |
|  | 1.5% Co |  |
|  | 0.6% W |  |

In addition, the dimensions of the bimetallic strip 12, 14 are selected to provide a large "gain," i.e., the dimensions that result in the highest change in flowrate to the channel 11 when subject to a change in temperature $$\left(\text{maximize} \frac{\Delta F_{channel}}{\Delta T}\right).$$

Bernoulli's principle may be used to approximate the relationship between flowrate and pressure drop across the arrays of bimetallic strips 12, 14 based on the nominal deflection, $d_{nom}$, which can be calculated by Equation 1. Assuming a selected nominal flowrate of $F_{nom}$, the required pressure drop at the nominal operating conditions ($\Delta P$) is calculated by:

$$\Delta P = \frac{\rho}{2}\left[\left(\frac{F_{nom}}{C_d(H_c - 2d_{nom})}\right)^2 - \left(\frac{F_{nom}}{C_d H_c}\right)^2\right] \quad (2)$$

The valve coefficient, $C_d$, is assumed to be 0.9, $\rho$ is the density of the fluid at the location of the bimetallic strips, and $H_c$ is the channel height (see FIG. 4).

To determine the "gain" or the change in flowrate resulting from a temperature change, the same equation is used, but the equation is solved for F as a function of the design pressure drop and deflection d at the disturbance temperature $T_{dist}$:

$$F = C_d(H_c^2 - 2H_c d)\sqrt{\frac{2\Delta P}{\rho}\frac{1}{4H_c d - 4d^2}} \quad (3)$$

Using Equations 1-3, the flowrate in the combustion channels can be determined as a function of the temperature and the geometric dimensions of the bimetallic strip. To find the optimal set of dimensions that give the highest gain, the following optimization problem is solved:

$$\underset{m, L_{strip}}{\text{minimize}} \; F(T_{diet})/F_{nom} \quad (4a)$$

$$\text{subject to } \frac{L_{strip}}{H_{strip}} \geq 10 \quad (4b)$$

$$H_{strip} = 0.05 H_c \quad (4c)$$

$$H_{strip} = H_1 + H_2 \quad (4d)$$

$$m = \frac{H_1}{H_2} \quad (4e)$$

$$H_1, H_2 > \frac{H_{strip}}{9} \quad (4f)$$

$$2d(T_{dist}) \leq 0.95 H_c \quad (4g)$$

where the objective is to minimize the flowrate F at the temperature ($T_{dist}$) reached during a disturbance. $T_{dist}$ may be assumed to be about 100° C. above the nominal temperature, in some implementations. As shown in constraints 4a-4g above, the bimetallic strip length $L_{strip}$ is at least about ten times greater than the thickness $H_{strip}$ of the bimetallic strip 12, 14, the individual thicknesses of each metal strip 21, 22 (i.e., $H_1$ and $H_2$) are at least about ⅑ of the combined thickness $H_{strip}$, the bimetallic strip thickness $H_{strip}$ is about 1/20 of the channel height, and twice the deflection d of each strip 12, 14 at the disturbance temperature $T_{dist}$ is less than or equal to about 95% the channel height $H_c$ so as to not completely obstruct the channel 11 at elevated temperatures (i.e., allow for continuous flow through the channel 11). In other implementations, the bimetallic strip thickness $H_{strip}$ may be between about 1/10 to about 1/30 of the channel height $H_c$, for example.

The number of degrees of freedom for the design optimization problem is relatively small, so a search may be performed to determine the optimal dimensions of the bimetallic strips 12, 14, according to certain implementations. The search space may be discretized into a certain number of points (for example, 50 points) form, which may vary from 0.111 to 9, and 100 elements for $L_{strip}/H_{strip}$, which varied from 10 to 100. The objective and constraints may be calculated for every combination of m and $L_{strip}/H_{strip}$ using the following algorithm:

1. Calculate the deflection $d_{nom}$ at the current dimensions and the nominal maximum reactor temperature using Equation (1).

2. Calculate the pressure drop required to achieve the nominal flowrate across the valve with deflection $d_{nom}$ from Equation (2).

3. Compute the deflection d at the elevated disturbance temperature ($T_{dist}$).

4. Calculate the flowrate F ($T_{dist}$) from Equation (3).

Figure 7:
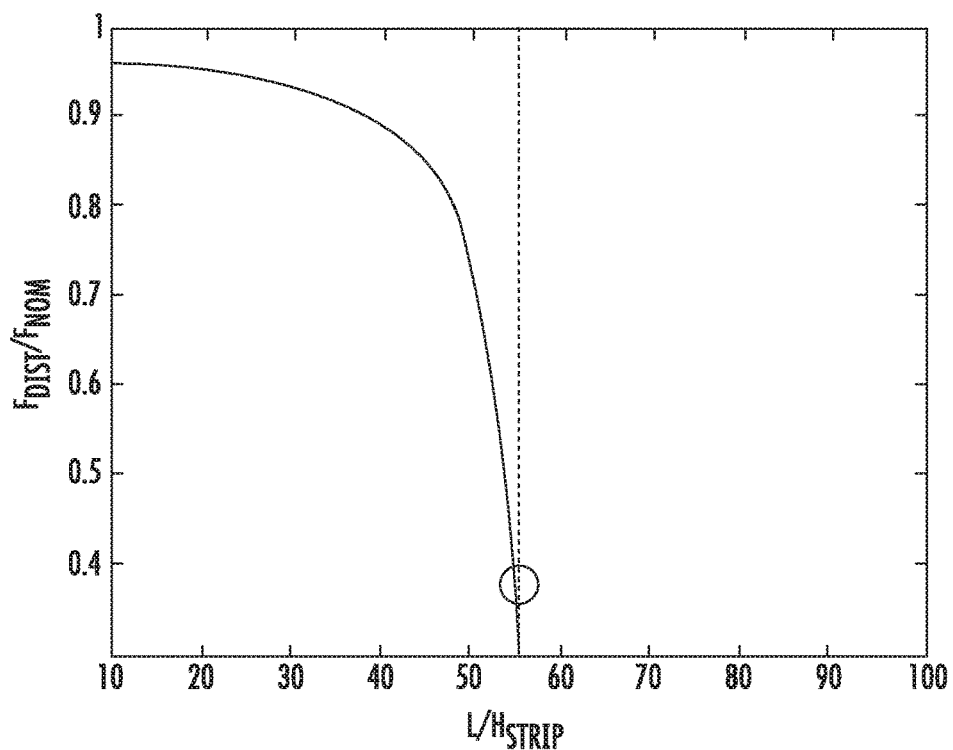
FIG. 7 illustrates objective function ($F_{dist}/F_{nom}$) compared to a length of a bimetallic strip, according to one implementation.

In FIG. 7, the objective function is plotted compared to the bimetallic strip length $L_{strip}$. The thickness ratio had little effect on the optimal solution, so an equal thickness ratio was selected (m=1). In FIG. 7, the points that do not satisfy constraint 4g at the disturbance temperature $T_{dist}$ are to the right of the vertical line at $L_{strip}/H_{strip}$=55. The optimal point ($L_{strip}/H_{strip}$=55) can achieve a 60% reduction in the flowrate when subject to a 100° C. rise in temperature. The strip thickness $H_{strip}$ is fixed at about 0.1 mm. Thus, the optimal strip length for this implementation is $L_{strip}$=5.5 mm. However, optimal strip dimensions may vary from this implementation depending on the flow environment in which the bimetallic strips 12, 14 may be used, according to various implementations.

The reactor may be simulated with and without the thermally-actuated valves to validate the effectiveness of the arrays of bimetallic strips 12, 14. The following assumptions may be made to simplify the problem:

The flowrate of the gas in the combustion channel is determined by the pressure drop across the valve.

The effect of the valves in the flow profile is not considered; a parabolic flow profile is maintained along the entire length of the reactor. This is justified by the strips being less than 1% of the reactor length and the low Reynolds number of the flow.

The response of the valve is assumed to be fast (i.e., the valve dynamics are not considered). This is justified by the very small physical dimensions of the bimetallic strips.

The transient and steady state effects of the reactor are considered when subject to a sequence of disturbances in the flowrate to the reforming channel.

Autothermal microchannel reactors with a natural gas feedstock may be subject to several operational disturbances including fluctuations in inlet pressure, composition, temperatures, and flowrate to the reforming channel. The disturbances with the most deleterious effects are those which reduce the heat absorbed in the endothermic channel (e.g., a reduction in the flowrate to the reforming channels). This results in an excess of heat that cause temperatures in the reactor to rise and form hotspots.

Figure 8A:
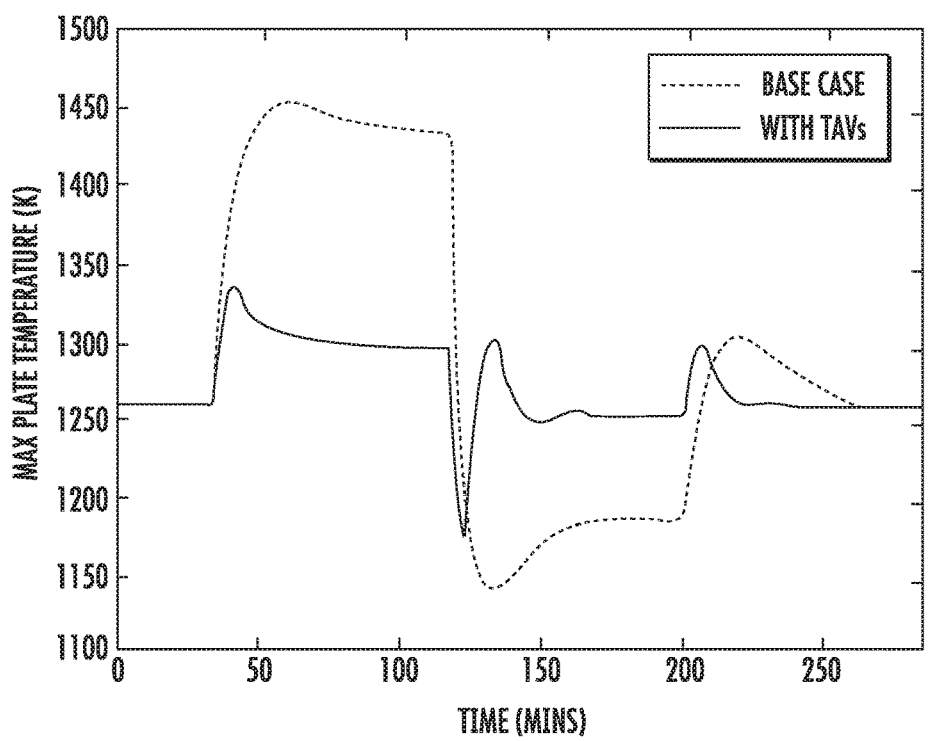
FIGS. 8A and 8B illustrate results of a simulation on a reactor model with and without thermally actuated valves, according to one implementation.
Figure 8B:
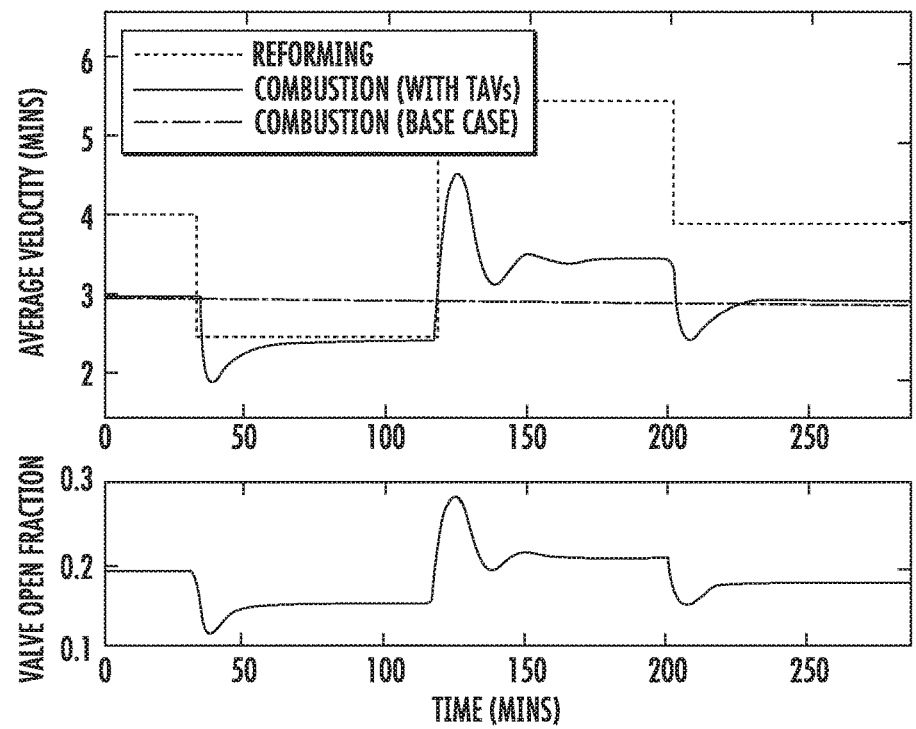

Here a disturbance sequence is considered in which the flowrate to the reforming channels first drops by 40% of the nominal capacity, then increases by 40% of the nominal capacity, and finally reverts to the nominal value. Simulations are carried out on the reactor model with and without the thermally-actuated valves (TAVs). The results are presented in FIGS. 8A-8B. The maximum plate temperature is plotted for the reactors with and without the TAVs in FIG. 8A. The disturbance (flowrate to the reforming channel), valve position (given by the valve open fraction ($2d/H_c$)), and the corresponding combustion flowrate are plotted in FIG. 8B. The TAVs provide robust control of the maximum reactor temperature. Throughout the sequence the maximum temperature in the reactor with the TAVs never rises above 1060° C., compared to the reactor without the TAVs reaching temperatures in excess of 1180° C.

Figure 9:
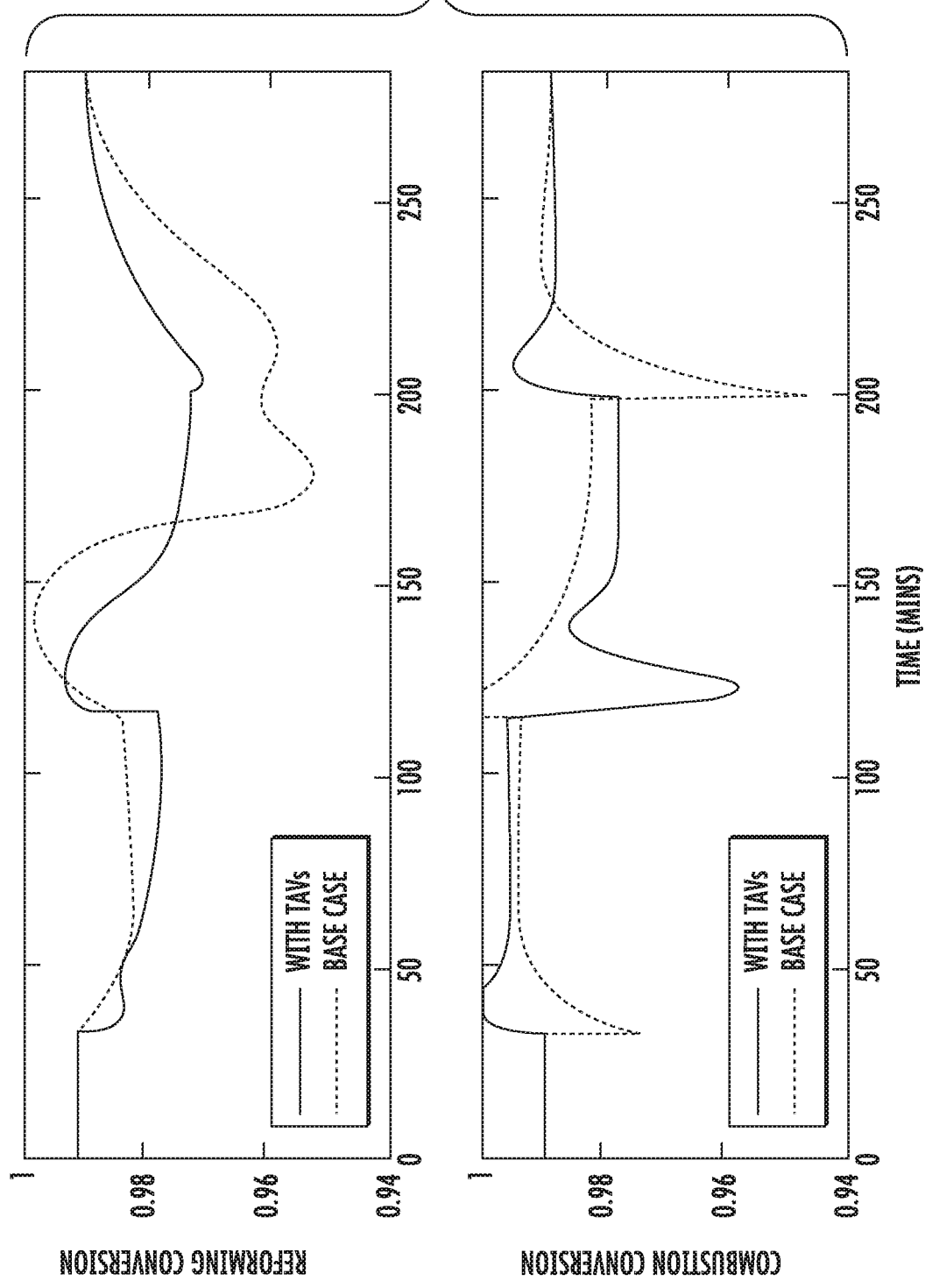
FIG. 9 illustrates combustion and reforming conversion in each channel over time, according to one implementation.

Furthermore, as seen in FIG. 9, the conversion in either channel has less variability throughout the disturbance sequence, and reforming conversion is maintained above 97%.

The effect of the reforming flowrate disturbances on the steady state reactor temperature profiles may also be considered with and without the thermally actuated valves (TAVs). While in the present context the change in reforming flowrate is the result of a disturbance, it can also occur as a consequence of flow nonuniformity/maldistribution. Microchannel reactors can have hundreds of channels, and it is difficult to design distribution headers such that the feed streams are distributed evenly among all the many channels. Furthermore, it is difficult to ensure that flow is evenly distributed in the horizontal dimension of each channel (the dimension "into the page" in FIG. 4). This unequal flow distribution can potentially be harmful to the reactor. For example, when flow to one reforming channel is lower than the average due to channel blockage, the result is an excess of heat generation, and consequently higher temperatures that may cause damage to the catalyst coating or the reactor structure. With TAVs, the flowrate in the adjacent combustion channels would reduce to compensate for these high temperatures.

Figure 10A:
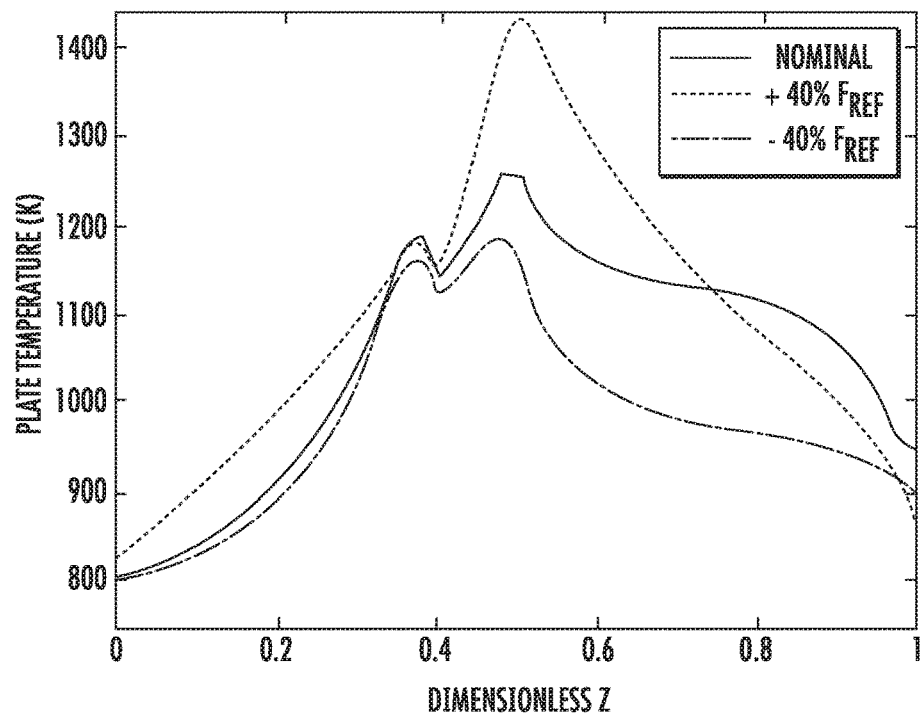
FIGS. 10A and 10B illustrate results of a ±40% change from flowrate in a channel without thermally actuated valves and in a channel with thermally actuated valves, respectively, according to one implementation.
Figure 10B:
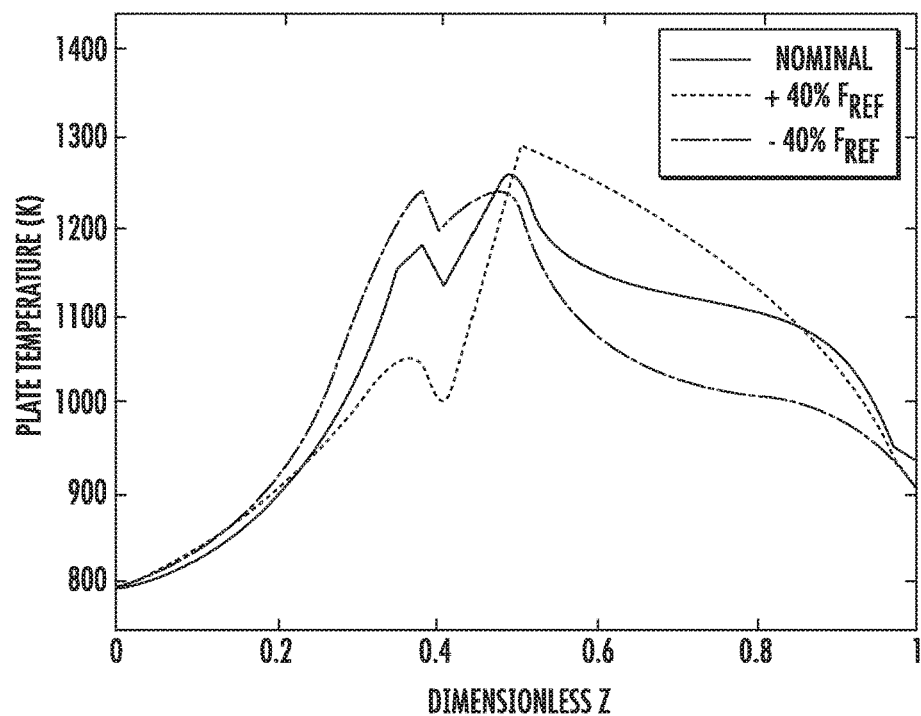

The results for a ±40% change from the nominal reforming flowrate are presented in FIGS. 10A-10B. FIG. 10A shows the steady-state plate temperature profiles for the reactor without the TAVs at the nominal conditions (solid), and when the reforming flowrate is 40% higher (dashed) and lower (dash-dot) than the nominal flowrate. In FIG. 10B, the same results are displayed for the reactor with the TAVs. In the reactor without TAVs, the flowrate in the combustion channel remains at the nominal level for all cases. By contrast, in the reactor equipped with the TAVs, the flowrate in the combustion channel decreases by 17.4% when the flowrate to the reforming channel is 40% below the nominal value, and increases by 15.8% when the flowrate in the reforming channel is 40% above the nominal value. The change in combustion flowrate results in a change in the rate of heat generation, which counteracts the temperature change.

The results described above in relation to FIGS. 7 through 10B suggest that thermally-actuated valves are an inherently safer design feature in autothermal microchannel reactors where distributed measurements and actuators are not available, according to various implementations. The control action provided by the thermally-actuated valves greatly reduces the impacts of flow nonuniformity between channels and disturbances.

In some implementations, optimization and/or simulation of the thermally actuated flow system may be performed by at least one processor of at least one electronic computing device or stored as computer program instructions on computer readable medium.

Typically in microchannel reaction systems, a boundary feedback control system is implemented that uses temperature measurements at the channel exits to modulate the aggregate inlet flowrates. While simulations have validated this method in mitigating the effects of disturbances, there are several potential issues with the boundary control approach: i) the maximum reactor temperature is the desirable controlled variable, ii) the time delay for detecting an event occurring within the reactor at the boundary may be relatively long, and iii) distributed temperatures cannot be sensed. The maximum, most harmful temperatures typically occur at the center of the microchannel reactors.

The thermally-actuated valves address these challenges, according to various implementations. They directly sense and control the maximum temperature in the reactor as opposed to the channel exit temperatures, and disturbances are immediately detected and mitigated. The result is a more robust system with shorter response time. In addition, the thermally actuated valves may be disposed at any distributed point along the microchannel reactors, allowing them to respond to disturbances more quickly. Furthermore, the thermally actuated valves can control the flow rate in each channel, not just at an inlet of the reactor.

Thus, bimetallic strips may be used as a thermally-actuated valve in an autothermal microchannel reactor, according to various implementations. Through proper selection of the material properties and dimensions, coupling bimetallic strips on either side of the combustion wall channel creates a valve that provides significant thermal management benefits. If local reactor temperatures differ from their nominal values due to operational disturbances or flow maldistribution, the deflection of the strips effectively closes or opens the valve to change the flowrate and compensate for the temperature change.

Simulations on a steam methane reforming microchannel reactor indicate that the thermally-actuated valves can adequately control reactor temperatures during disturbances in flowrate to the reforming channel. Additionally, the effects of flow maldistribution can be mitigated with the thermally-actuated valves.

Figure 11:
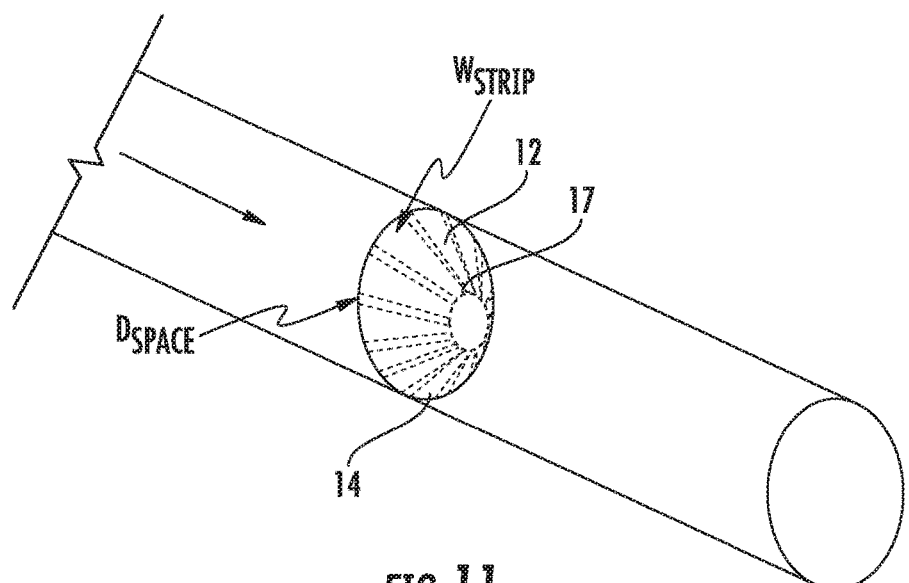
FIG. 11 illustrates a cylindrically shaped channel having a thermally actuated flow control system disposed therein, according to one implementation.

In addition, although the channel 11 shown in FIG. 4 is defined by at least two parallel, spaced apart plates, the channel may have other suitable shapes. For example, the channel may be defined by an inner wall of a conduit, such as a cylindrically shaped pipe or duct or other shaped conduit through which fluid may flow. In some implementations in which the channel is defined by the inner wall of a cylindrically shaped pipe, the width of each strip $W_{strip}$ may be selected to be between about $1/60^{th}$ and about $1/6^{th}$ of a circumference of the channel. In addition, a distance between adjacent bimetallic strips, $D_{space}$, may be between about $1/60^{th}$ and about $1/6^{th}$ of the circumference of the channel. The free ends 17 of the bimetallic strips 12, 14 deflect toward a central axis of the cylindrically shaped pipe. One such implementation is shown in FIG. 11.

Figure 12:
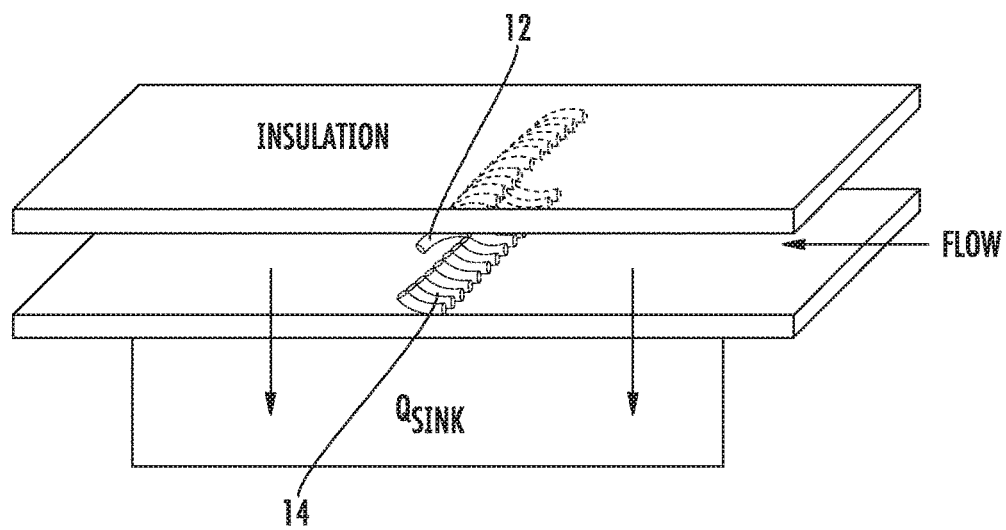
FIG. 12 illustrates a device coupled to an external wall of a channel through which heat is transferred from the channel, according to one implementation.

Furthermore, several implementations described above describe transferring heat from an exothermic reaction in one channel to an endothermic reaction in an adjacent channel. However, in other implementations, the thermally actuated flow control system may be used in a system in which heat, $Q_{sink}$, from the fluid in the exothermic reaction channel is conducted through at least one wall of the channel to a device that is coupled to an external wall of the channel. The deflection of the bimetallic strips 12, 14 in response to the temperature of the fluid flowing through the channel controls the amount of heat transferred through the channel wall to the device. One such implementation is shown in FIG. 12.

In addition, the above described implementations use bimetallic strips. However, other materials may be used instead of bimetallic strips, such as strips comprising non-metallic materials that are responsive to changes in temperature, or a composite of metallic and non-metallic materials.

Various modifications of the devices and methods in addition to those shown and described herein are intended to fall within the scope of the appended claims. Further, while only certain representative devices and method steps disclosed herein are specifically described, other combinations of the devices and method steps are intended to fall within the scope of the appended claims, even if not specifically recited. Thus, a combination of steps, elements, components, or constituents may be explicitly mentioned herein. However, other combinations of steps, elements, components, and constituents are included, even though not explicitly stated. The term "comprising" and variations thereof as used herein is used synonymously with the term "including" and variations thereof and are open, non-limiting terms.

Model Equations

The model equations used for simulations

Gas Phase

Mass balances $$\frac{\partial \rho_j^g \omega_{i,j}^g}{\partial t} + \rho_j^g u_{z_j} \frac{\partial \omega_{i,j}^g}{\partial z} = \frac{\partial}{\partial x_j^g}\left(\rho_j^g D_{i-mix_j} \frac{\partial \omega_{i,j}^g}{\partial x_j^g}\right) + \frac{\partial}{\partial z}\left(\rho_j^g D_{i-mix_j} \frac{\partial \omega_{i,j}^g}{\partial z}\right) + \sum_k (v_{i,k,j} r_{homog,k,j} M_{i,j})$$

Energy balances $$\rho_j^g c_{pj}^g \frac{\partial T_j^g}{\partial t} + \rho_j^g u_{z_j} c_{pj}^g \frac{\partial T_j^g}{\partial z} = \frac{\partial}{\partial x_j^g}\left(k_j^g \frac{\partial T_j^g}{\partial x_j^g}\right) + \frac{\partial}{\partial z}\left(k_j^g \frac{\partial T_j^g}{\partial z}\right) + \sum_k (r_{homog,k,j} \Delta H_{rxn_{j,k}})$$

Continuity equation $$\frac{\partial \rho_j^g}{\partial t} + \frac{\partial \rho_j^g u_{z_j}}{\partial z} = 0$$

Equation of state for ideal gas $$\rho_j^g = \frac{P_j}{R_g T_j^g} \cdot \left(\sum_i \frac{\omega_{i,j}^g}{M_{i,j}}\right)^{-1}$$

Gas Phase boundary conditions

Inlet conditions $$\omega_{i,j}^g = \omega_{i,j}^0$$

$$T_j^g = T_j^0$$

$$u_{z_j} = 1.5 u_j^0 \left[1 - \left(\frac{x_j^g}{R_j}\right)^2\right]$$

Outlet conditions $$\left.\frac{\partial \omega_{i,1}^g}{\partial z}\right|_{z=L;\forall x_1^g} = \left.\frac{\partial T_1^g}{\partial z}\right|_{z=L;\forall x_1^g} = 0$$

$$\left.\frac{\partial \omega_{i,2}^g}{\partial z}\right|_{z=0;\forall x_2^g} = \left.\frac{\partial T_2^g}{\partial z}\right|_{z=L;\forall x_2^g} = 0$$

Chennel center conditions $$\left.\frac{\partial \omega_{i,j}^g}{\partial x_j^g}\right|_{x_j^g=0;\forall z} = \left.\frac{\partial T_{i,j}^g}{\partial x_j^g}\right|_{x_j^g=0;\forall z} = \left.\frac{\partial u_{z_j}}{\partial x_j^g}\right|_{x_j^g=0;\forall z} = 0$$

Catalyst surface conditions $$\left.\rho_j^g D_{G,i-mix_j} \frac{\partial \omega_{i,j}^g}{\partial x_j^g}\right|_{x_j^g=R_j;\forall z} = \left.-\rho_j^g D_{eff_i,j} \frac{\partial \omega_{i,j}^{cat}}{\partial x_j^{cat}}\right|_{x_j^{cat}=\delta_j^{cat};\forall z}$$

$$j=1: \left.k_1^g \frac{\partial T_1^g}{\partial x_1^g}\right|_{x_1^g=R_1;\forall z} = H_1 + \left.k^s \frac{\partial T^s}{\partial x^s}\right|_{x^s=0;\forall z}$$

$$j=2: \left.k_1^g \frac{\partial T_2^g}{\partial x_2^g}\right|_{x_2^g=R_2;\forall z} = H_2 - \left.k^s \frac{\partial T^s}{\partial x^s}\right|_{x^s=\delta^s;\forall z}$$

$$\left.u_{z_j}\right|_{x_j^g=R_j;\forall z} = 0$$

Catalyst Layer

Energy balance $$T_j^{cat} = \left.T_j^g\right|_{x_j^g=R_j}$$

Mass balance $$\frac{\partial}{\partial x_j^{cat}}\left(\rho_j^g D_{eff,i,j} \frac{\partial \omega_{i,j}^{cat}}{\partial x_j^{cat}}\right) = -\sum_k (v_{i,j,k} r_{j,k} M_{i,j})$$

Plate boundary conditions $$\left.\frac{\partial \omega_{i,j}^{cat}}{\partial x_j^{cat}}\right|_{x_j^{cat}=\delta_j^{cat};\forall z} = 0$$

Catalyst surface conditions $$\left.\omega_{i,j}^g\right|_{x_j^g=R_j;\forall z} = \left.\omega_{i,j}^{cat}\right|_{x_j^{cat}=\delta_j^{cat};\forall z}$$

Effectiveness factor $$\eta_{eff,k,j} = \frac{\frac{1}{\delta_j^{cat}} \int_0^{\delta_j^{cat}} r_{k,j} dx_j^{cat}}{\left.r_{k,j}\right|_{x_j^{cat}=\delta^{cat}}}$$

-continued

Reaction heat flux $$H_j = \sum_k \left( -\Delta H_{k,j} \int_0^{\delta_j^{cat}} r_{k,j} dx_j^{cat} \right)$$

Plate

Laplace equation $$\frac{\rho^s c_p^s}{k^s} \frac{\partial T^s}{\partial t} = \frac{\partial^2 T^s}{\partial z^2} + \frac{\partial^2 T^s}{\partial x^{s2}}$$

Inlet boundary conditions $$\left. \frac{\partial^2 T^s}{\partial z^2} \right|_{z=0;\forall x^s} = 0$$

Outlet boundary condition $$\left. \frac{\partial T^s}{\partial z} \right|_{z=L;\forall x^s} = 0$$

Catalyst surface condition $$j = 1: \; T^s|_{x^s=0;\forall z} = T_1^g|_{x_1^g=R_1;\forall z}$$

$$j = 2: \; T^s|_{x^s=\delta^s;\forall z} = T_2^g|_{x_2^g=R_2;\forall z}$$

The invention claimed is:

1. A thermally actuated flow control system disposed within a reactor, the control system comprising:
   a first linear array of bimetallic strips disposed on a first wall of a channel; and
   a second linear array of bimetallic strips disposed on a second wall of the channel, the first and second walls being opposite and in a facing relationship with each other relative to a fluid flow path through the channel, wherein:
      the first wall and/or the second wall comprises a catalyst layer, the catalyst layer enabling a combustible reaction of a fuel flowing through the channel,
      each bimetallic strip comprises a fixed end and a free end,
      the fixed ends of the bimetallic strips in the first array are coupled to the first wall,
      the fixed ends of the bimetallic strips in the second array are coupled to the second wall,
      each bimetallic strip comprises a first metal strip having a first thermal expansion coefficient and a second metal strip having a second thermal expansion coefficient, the first and second metal strips being fixedly coupled together, and the first thermal expansion coefficient being higher than the second thermal expansion coefficient, wherein the first metal strip is coupled to the wall, and the second metal strip extends towards the fluid flow path through the channel, and
   a deflection of the free ends of the bimetallic strips first array away from the first wall and the free ends of the bimetallic strips of the second array away from the second wall increases as a temperature of the fuel flowing through the channel increases, which decreases a flowrate of the fuel flowing through the channel and reduces the rate of heat generation by the combustion reaction, and the deflection of the free ends of the bimetallic strips of the first array and the second array decreases as the temperature of the fuel flowing through the channel decreases, which increases the flowrate of the fuel flowing through the channel and increases the rate of heat generation by the combustion reaction.

2. The thermally actuated flow control system of claim 1, wherein the first thermal expansion coefficient is about 5% to about 40% less than the second thermal expansion coefficient.

3. The thermally actuated flow control system of claim 2, wherein the first thermal expansion coefficient is about 33% less than the second thermal expansion coefficient.

4. The thermally actuated flow control system of claim 1, wherein the first metal strip and the second metal strip each have a melting temperature that is higher than about 1000° C.

5. The thermally actuated flow control system of claim 1, wherein the fixed ends are directly coupled to the channel walls.

6. The thermally actuated flow control system of claim 1, wherein a length of each bimetallic strip is at least ten times longer than a thickness of each bimetallic strip, the length being measured in the axial flow direction between the fixed end and the free end, and the thickness of each bimetallic strip comprising a thickness of the first metal strip and the second metal strip.

7. The thermally actuated flow control system of claim 6, wherein the length of each bimetallic strip is at least ten times longer than a width of each bimetallic strip, the width being measured in a direction that is orthogonal to the length direction and thickness direction.

8. The thermally actuated flow control system of claim 7, wherein the width of each bimetallic strip is between about 5 and about 10 times greater than the thickness of each bimetallic strip.

9. The thermally actuated flow control system of claim 1, wherein a length of each bimetallic strip is at least ten times longer than a width of each bimetallic strip, the length being measured in the axial flow direction between the fixed end and the free end, and the width being a distance between opposite edges of the strip that extend between the fixed end and free end, the edges being perpendicular to the direction of flow through the channel.

10. The thermally actuated flow control system of claim 1, wherein a distance between the first and second walls is at least around ten times longer than a thickness of each bimetallic strip, the thickness of each bimetallic strip comprising a thickness of the first metal strip and the second metal strip.

11. The thermally actuated flow control system of claim 10, wherein the distance between the first and second walls is around twenty times longer than the thickness of each bimetallic strip.

12. The thermally actuated flow control system of claim 1, wherein a thickness of the first metal strip is at least $\frac{1}{10}^{th}$ of a thickness of the bimetallic strip.

13. The thermally actuated flow control system of claim 1, wherein a thickness of the second metal strip is at least $\frac{1}{10}^{th}$ of a thickness of the bimetallic strip.

14. The thermally actuated flow control system of claim 1, wherein the free ends of the bimetallic strips in the first array are aligned with the free ends of the bimetallic strips in the second array within a plane that bisects the first and second walls and is perpendicular to the flow path through the channel.

15. The thermally actuated flow control system of claim 1, wherein the first and second arrays of bimetallic strips are disposed centrally along a length of the channel.

16. The thermally actuated flow control system of claim 1, wherein the first and second arrays of bimetallic strips are disposed adjacent to a portion of the channel where the largest temperature changes are expected to occur.

17. The thermally actuated flow control system of claim 1, wherein a length of each bimetallic strip is selected such that a distance between the free ends of the first array and the free ends of the second array is at least about 5% of a height of the channel at a maximum expected temperature for the fuel, the length being measured in the axial flow direction between the fixed end and the free end of each bimetallic strip.

18. The thermally actuated flow control system of claim 1, wherein the reactor is a microchannel reactor.

19. The thermally actuated flow control system of claim 1, wherein the channel is defined by at least two parallel plates.

20. The thermally actuated flow control system of claim 1, wherein the channel is defined by an inner wall of a conduit.

21. The thermally actuated flow control system of claim 20, wherein a width of each bimetallic strip is between about $1/60$th and about $1/6$th of a circumference of the channel, and a distance between edges of adjacent bimetallic strips is between about $1/60$th and about $1/6$th of the circumference of the channel, wherein edges of each bimetallic strip extend between the fixed and free ends of each bimetallic strip, and the edges are perpendicular to the direction of flow through the channel.

22. The thermally actuated flow control system of claim 20, wherein the free ends of the bimetallic strips deflect towards a central axis of the conduit.

23. The thermally actuated flow control system of claim 1, wherein a device is coupled to an external surface of the first or the second wall, and the deflection of the bimetallic strips in response to the temperature of the fuel flowing through the channel controls the amount of heat transferred through the first or the second wall to the device.

24. The thermally actuated flow control system of claim 1, wherein a length of each bimetallic strips is selected such that the free ends of the first array and the free ends of the second array are not spaced apart at the maximum expected temperature for the fuel, the length being measured in the axial flow direction between the fixed end and the free end.

25. The thermally actuated flow control system of claim 1, wherein the fixed end of each bimetallic strip is upstream of the respective bimetallic strip.

* * * * *